(12) United States Patent
Song et al.

(10) Patent No.: US 11,639,736 B2
(45) Date of Patent: May 2, 2023

(54) STRUT BEARING ASSEMBLY FOR VEHICLE (71) Applicants: HYUNDAI MOBIS CO., LTD., Seoul (KR); ILJIN CO., LTD., Gyeongju-si (KR)

(72) Inventors: Min Soo Song, Yongin-si (KR); Sung Jin Won, Yongin-si (KR); Byung Hwan Kim, Namyangju-si (KR); Tae Ho Hong, Seoul (KR)

(73) Assignees: HYUNDAI MOBIS CO., LTD., Seoul (KR); ILJIN CO., LTD., Gyeongju-si (KR)

( * ) Notice: Subject to any disclaimer, the term of this patent is extended or adjusted under 35 U.S.C. 154(b) by 0 days.

(21) Appl. No.: 17/477,711

(22) Filed: Sep. 17, 2021

(65) Prior Publication Data
US 2022/0090624 A1 Mar. 24, 2022

(30) Foreign Application Priority Data
Sep. 22, 2020 (KR) ........................ 10-2020-0122275

(51) Int. Cl.
*F16C 33/10* (2006.01)
*B60G 15/06* (2006.01)
*F16C 17/10* (2006.01)

(52) U.S. Cl.
CPC .......... *F16C 33/102* (2013.01); *B60G 15/068* (2013.01); *B60G 2204/418* (2013.01); *F16C 17/10* (2013.01); *F16C 2326/05* (2013.01)

(58) Field of Classification Search
CPC .......... F16C 17/04; F16C 17/10; F16C 17/18; F16C 33/102; F16C 2326/05; B60G 15/067; B60G 15/068; B60G 2204/418
See application file for complete search history.

(56) References Cited

U.S. PATENT DOCUMENTS

2014/0119682 A1* 5/2014 Morishige ............... F16C 33/20
384/368

FOREIGN PATENT DOCUMENTS

| JP | H08159160 A | * | 6/1996 |
| JP | H11303873 A | * | 11/1999 |
| KR | 10-1479594 B1 | | 1/2015 |

OTHER PUBLICATIONS

Machine Translation of JP-H08159160-A (Year: 1996).*
Machine Translation of JP-H11303873-A (Year: 1999).*

* cited by examiner

*Primary Examiner* — Alan B Waits
(74) *Attorney, Agent, or Firm* — NSIP Law (57) ABSTRACT

A strut bearing assembly includes: a first case coupled to an insulator mounted on a body of the vehicle, and having a strut disposed therethrough; a second case mounted under the first case in a top-to-bottom direction of the vehicle, configured to rotate relatively to the first case, and having the strut disposed therethrough; and a center plate disposed between the first and second cases, and configured to support the first case to rotate relative to the second case. The center plate has a ring shape with a hollow portion, and includes an inclined portion that is inclined downward toward an outside in a radial direction based on a central axis of the strut.

11 Claims, 11 Drawing Sheets

STRUT BEARING ASSEMBLY FOR VEHICLE

CROSS-REFERENCE TO RELATED APPLICATIONS

This application claims the benefit under 35 U.S.C. § 119(a) of Korean Patent Application No. 10-2020-0122275, filed on Sep. 22, 2020 in the Korean Intellectual Property Office, the entire disclosure of which is incorporated herein by reference for all purposes.

BACKGROUND

Field

Exemplary embodiments of the present disclosure relate to a strut bearing assembly for a vehicle, and more particularly, to a strut bearing assembly for a vehicle, which can stably support a lateral load as well as a vertical load.

Discussion of the Background

In general, a suspension system of a vehicle connects an axle to the body of the vehicle, such that vibration or shock, applied to the axle from the road when the vehicle travels, is not directly transferred to the vehicle body. Thus, the suspension system may prevent damage to the vehicle body or freight, and improve the ride quality of the vehicle.

Such a suspension system is divided into various systems depending on a vibration control method or a coupling method with the vehicle body. A front suspension system which is divided according to the form of a front axle connects the vehicle body frame and the axle to support the weight of the vehicle, and absorbs vibration which is generated from a wheel, and a part of a steering apparatus of the vehicle is installed on the front suspension system.

The front suspension system is divided into a wishbone type suspension system and a Macpherson type suspension system. Between them, the Macpherson type suspension system has a simpler structure and a better rid quality than the wishbone type suspension system, and thus is widely used in a car or the like.

Such a Macpherson type suspension system has no upper arm, but has a lower arm connected to the bottom of a strut having a shock absorber embedded therein through a steering knuckle, such that the steering knuckle and the strut are rotated together during a steering operation. Furthermore, the upper portion of the strut is installed to rotate relatively to the vehicle body or chassis with a strut bearing interposed therebetween, such that the strut and the steering knuckle are rotated together.

The strut bearing according to the related art may include an upper case, a lower case and a center plate interposed therebetween. The upper case and the lower case may be provided to rotate relatively to each other through a lubricant between the center plate and the upper case.

The Macpherson-type suspension system is characterized in that a load applied to a strut bearing assembly acts in a lateral direction as well as a vertical direction. However, when the center plate according to the related art includes only a vertical portion and a horizontal portion, the center plate effectively supports a load in the vertical direction, but may be vulnerable to a load in the lateral direction. In this case, the case and the center plate, which constitute a part, may be deformed. Therefore, there is a need for a structure capable of improving such a problem.

The related art of the present disclosure is disclosed in Korean Patent No. 10-1479594 registered on Dec. 30, 2014 and entitled "Insulator of Suspension System".

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a strut bearing assembly for a vehicle includes: a first case coupled to an insulator mounted on a body of the vehicle, and having a strut disposed therethrough; a second case mounted under the first case in a top-to-bottom direction of the vehicle, configured to rotate relatively to the first case, and having the strut disposed therethrough; and a center plate disposed between the first and second cases, and configured to support the first case to rotate relative to the second case. The center plate has a ring shape with a hollow portion, and includes an inclined portion that is inclined downward toward an outside in a radial direction based on a central axis of the strut.

The center plate may include a plate body, and the plate body may include the inclined portion, a vertical portion extended from an inner end of the inclined portion, and an end portion extended from an outer end of the inclined portion.

The inclined portion may be inclined at an angle that minimizes stress applied to the strut bearing assembly, according to a distribution of loads applied to the first and second cases and the center plate.

The second case may include: a vertical part disposed adjacent to the vertical portion; an inclined part extended from the vertical part, and disposed adjacent to the inclined portion; and a horizontal part extended horizontally from the inclined part and disposed adjacent to the end portion, such that the second case is disposed adjacent to the plate body.

The vertical part may include an insertion protrusion disposed on an outer surface thereof. The center plate is deformed by the insertion protrusion in an assembled state of the center plate and the second case.

The first case may include a first hook disposed in a circumferential direction of the first case. The second case may include a second hook disposed in a circumferential direction of the second case. The first and second hooks may be coupled to each other.

The second case may be made of a polyamide material.

The center plate may be made of polybutylene terephthalate (PBT).

The center plate may be made of a material having rigidity lower than a rigidity of the second case.

The center plate may further include a plurality of grooves disposed on an upper surface of the inclined portion, and configured to contain a lubricant.

The plurality of grooves may include first grooves elongated in the radial direction and spaced apart at intervals in a circumferential direction based on the central axis of the strut.

The plurality of grooves may include second grooves elongated in the circumferential direction, spaced apart at intervals in the radial direction, and disposed between adjacent first grooves, among the first grooves.

The plurality of grooves may include grooves elongated in a circumferential direction based on the central axis of the strut, and spaced apart at intervals in the radial direction.

Other features and aspects will be apparent from the following detailed description, the drawings, and the claims.

DETAILED DESCRIPTION OF THE ILLUSTRATED EMBODIMENTS

Hereafter, embodiments of the present disclosure will be described in detail with reference to the accompanying drawings.

The following embodiments are embodiments suitable for understanding of the technical features of a strut bearing assembly for a vehicle in accordance with the present disclosure. However, the present disclosure is not limited to the following embodiments, the technical features of the present disclosure are not limited by the following embodiments, and the present disclosure can be modified in various manners without departing from the scope of the present disclosure.

Figure 1:
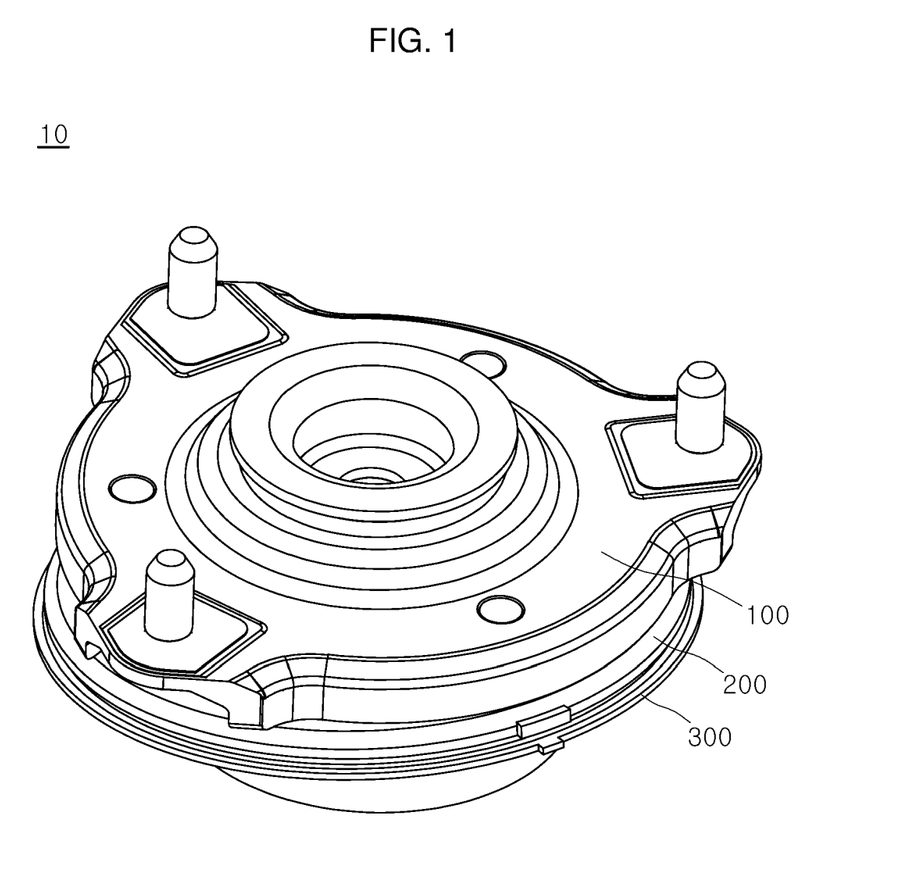
FIG. 1 is a perspective view illustrating a strut bearing assembly for a vehicle in accordance with an embodiment of the present disclosure.
Figure 2:
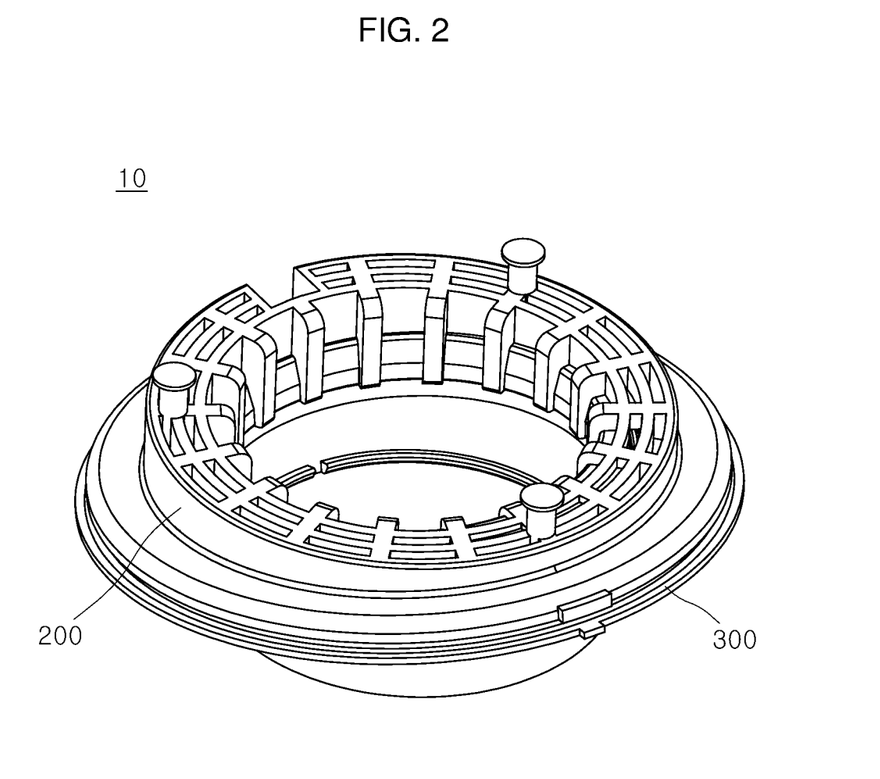
FIG. 2 is a perspective view illustrating the strut bearing assembly for a vehicle, from which an insulator of FIG. 1 is removed, in accordance with the embodiment of the present disclosure.
Figure 3:
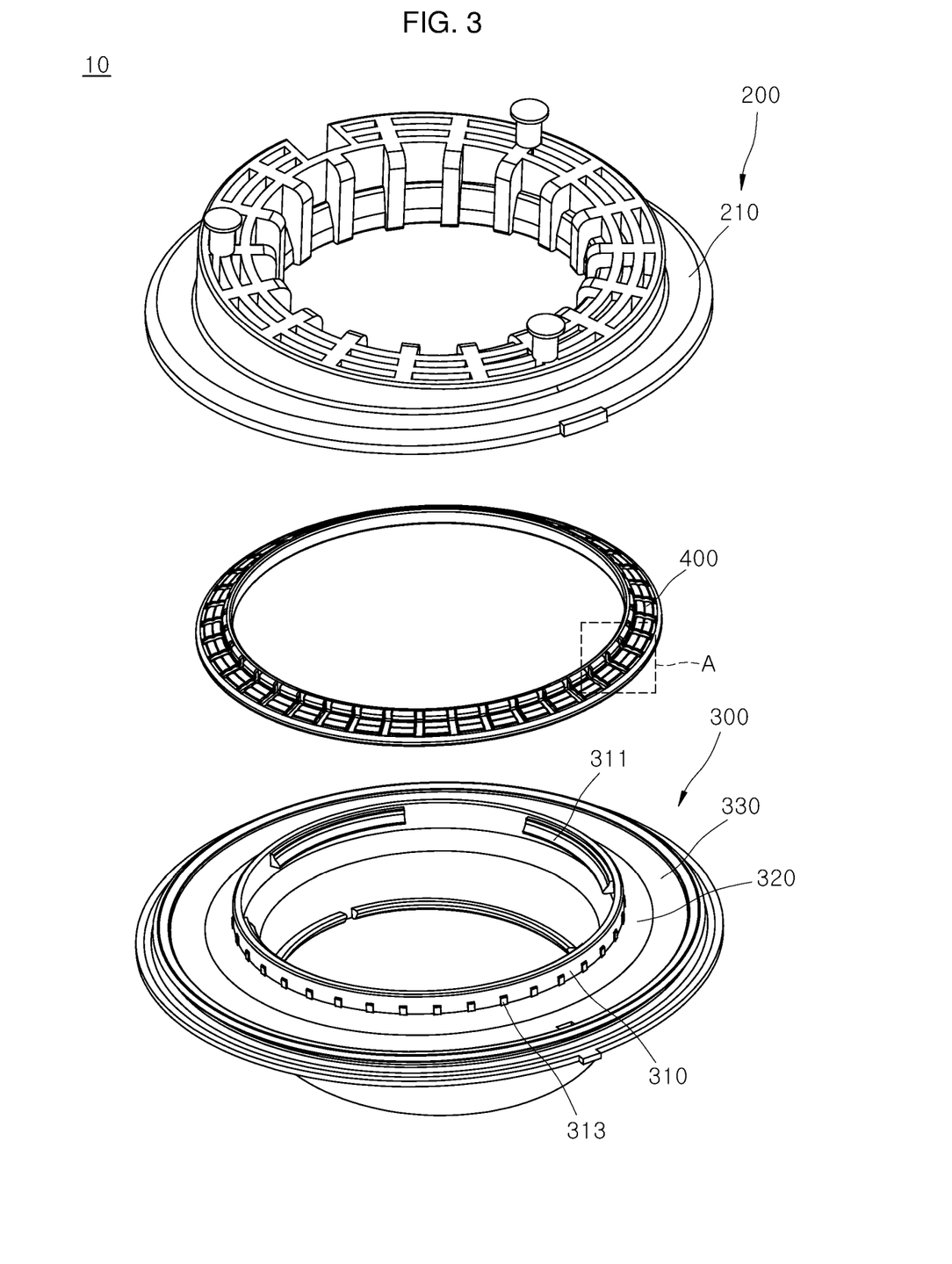
FIG. 3 is an exploded perspective view of FIG. 2.
Figure 4:
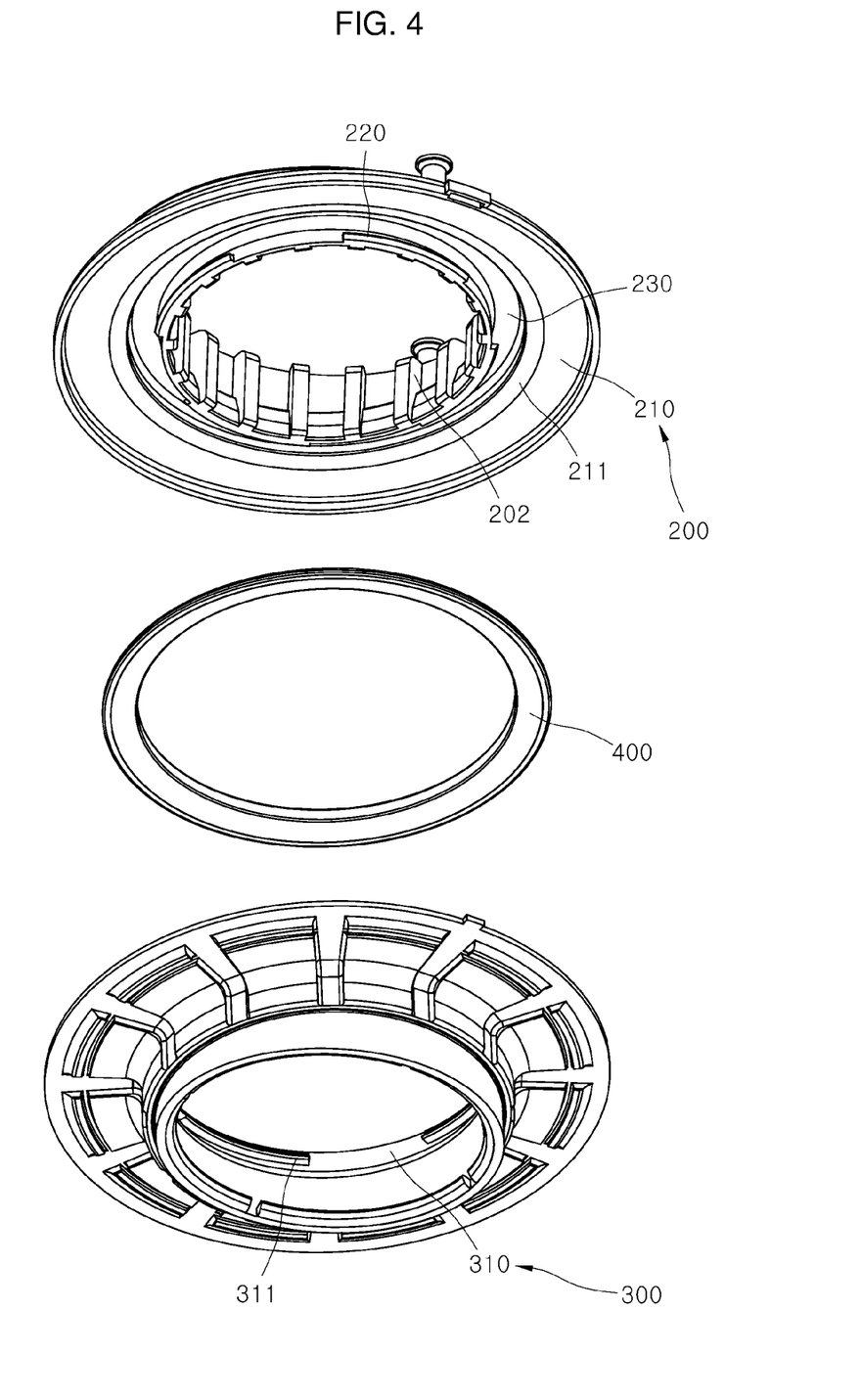
FIG. 4 is an exploded perspective view of FIG. 3 when seen from the bottom.
Figure 5:
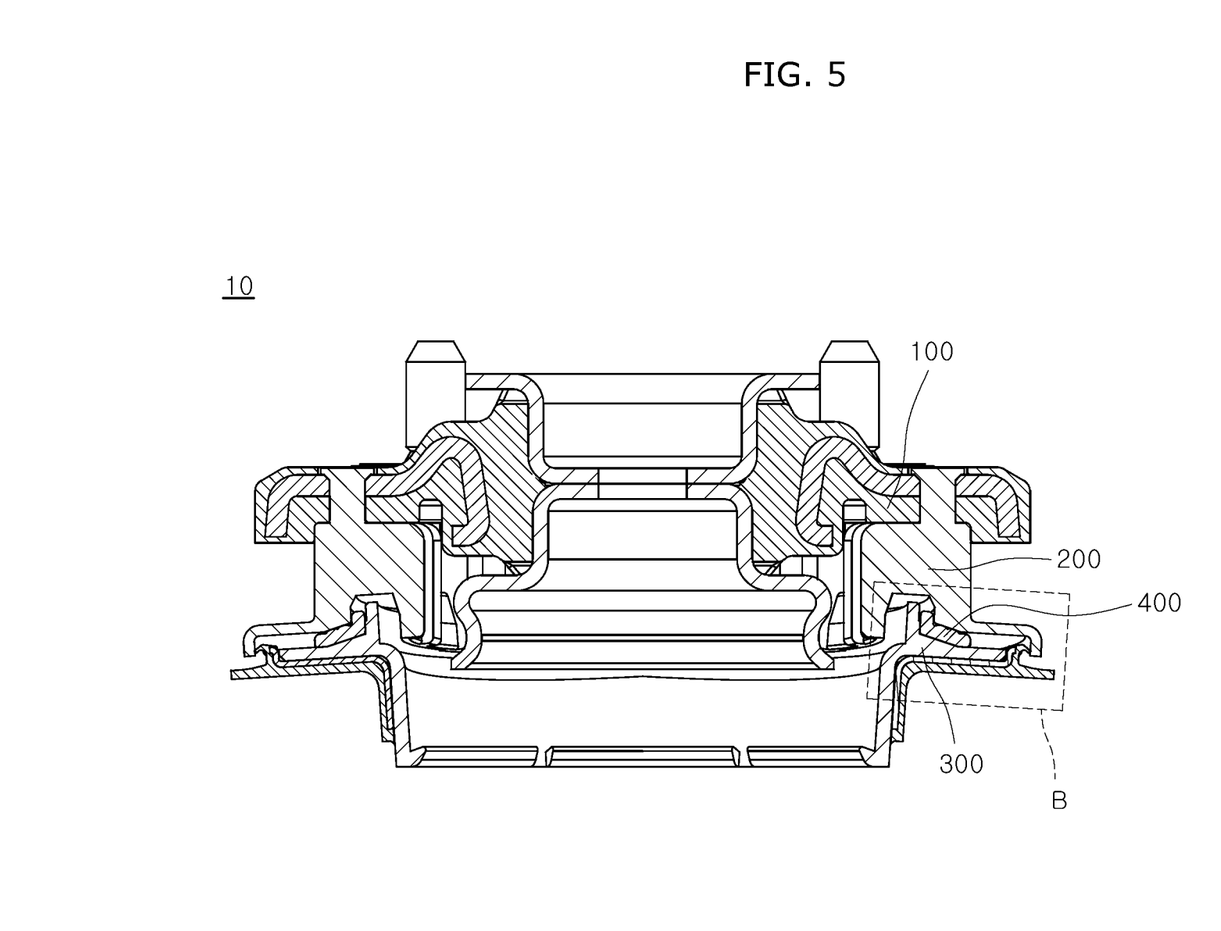
FIG. 5 is a vertical cross-sectional view of FIG. 2.
Figure 6:
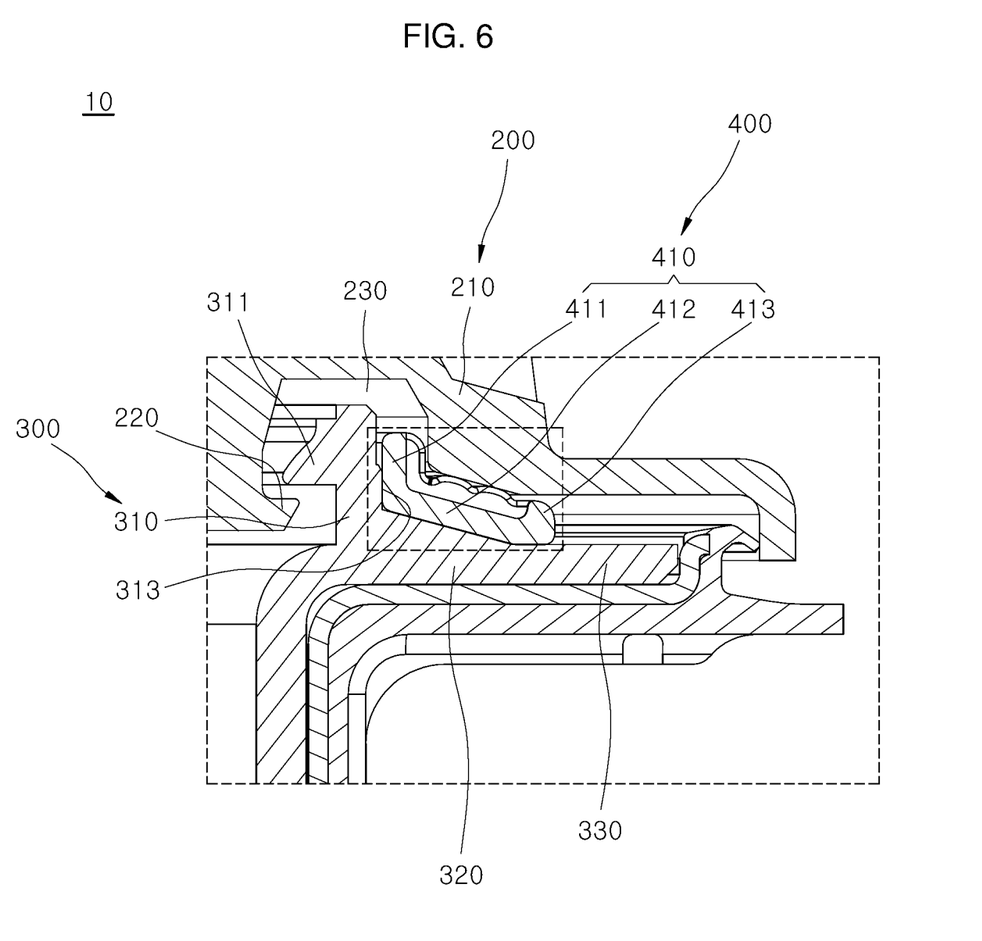
FIG. 6 is an expanded cross-sectional view of a portion B of FIG. 5.
Figure 7:
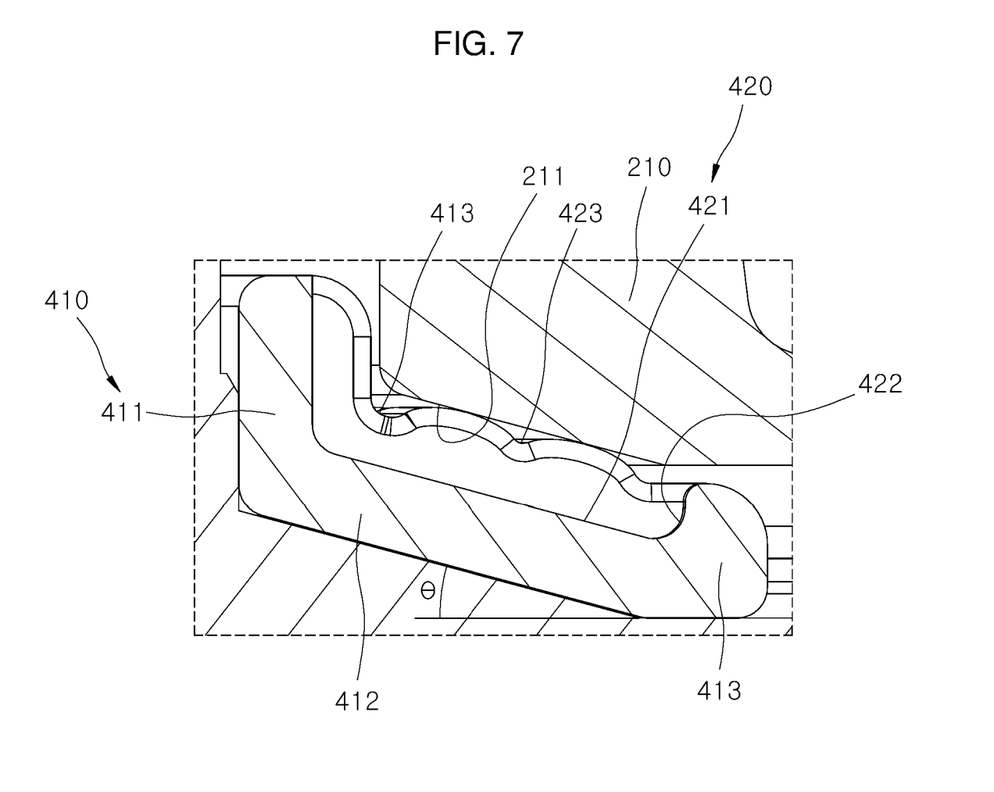
FIG. 7 is an expanded view of FIG. 6.

FIG. 1 is a perspective view illustrating a strut bearing assembly for a vehicle in accordance with an embodiment of the present disclosure, FIG. 2 is a perspective view illustrating the strut bearing assembly for a vehicle, from which an insulator of FIG. 1 is removed, in accordance with the embodiment of the present disclosure, FIG. 3 is an exploded perspective view of FIG. 2, FIG. 4 is an exploded perspective view of FIG. 3 when seen from the bottom, FIG. 5 is a vertical cross-sectional view of FIG. 2, FIG. 6 is an expanded cross-sectional view of a portion B of FIG. 5, FIG. 7 is an expanded view of FIG. 6.

Figure 8:
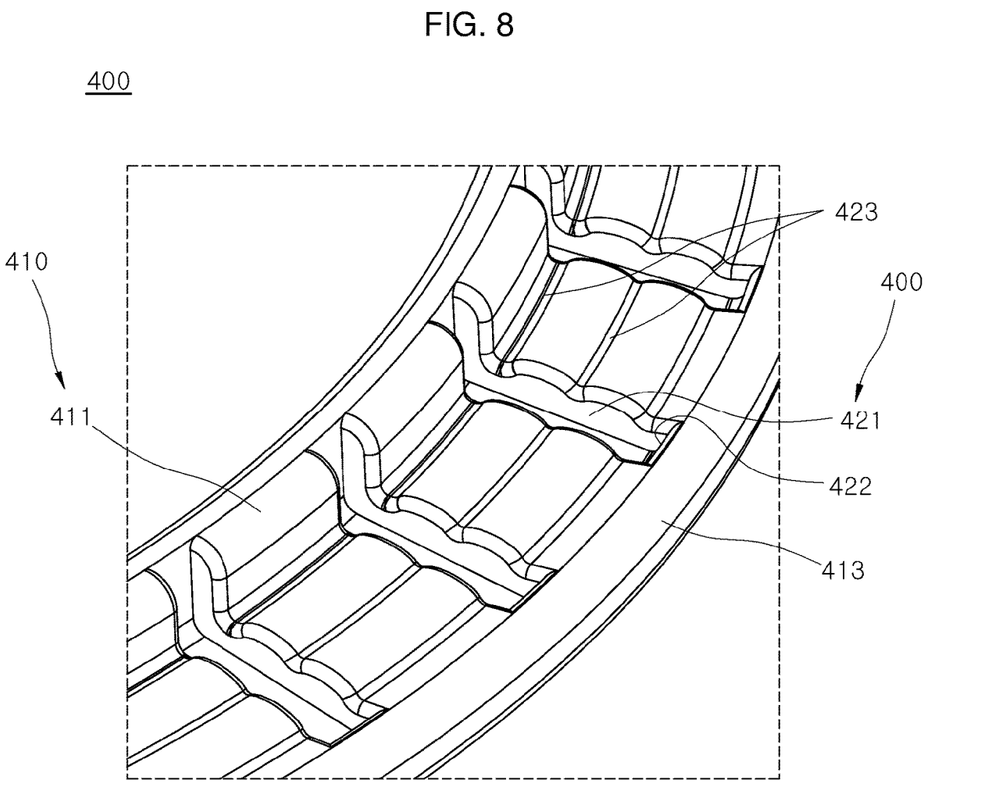
FIG. 8 is an expanded view of a portion A of FIG. 3.
Figure 9:
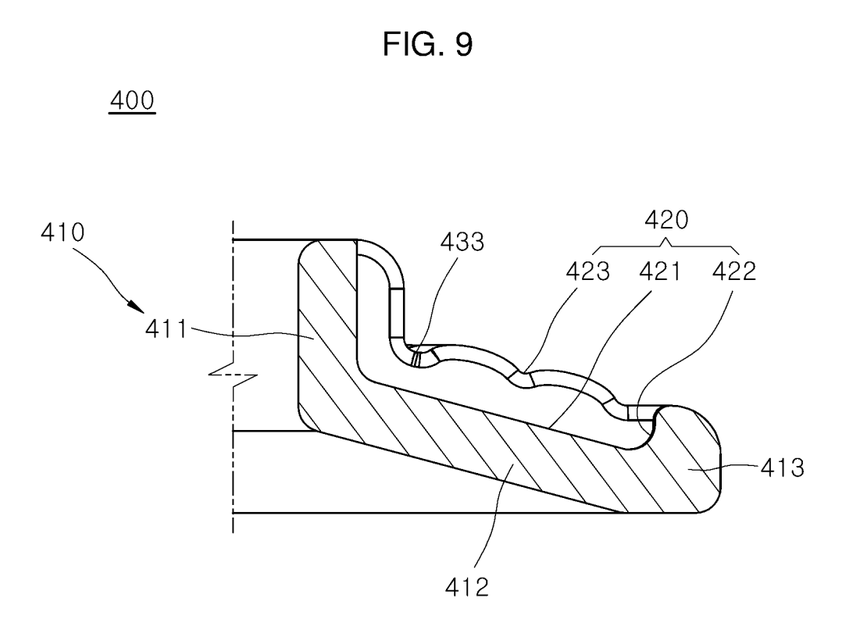
FIG. 9 is a vertical cross-sectional view of a center plate in accordance with the embodiment of the present disclosure.
Figure 10:
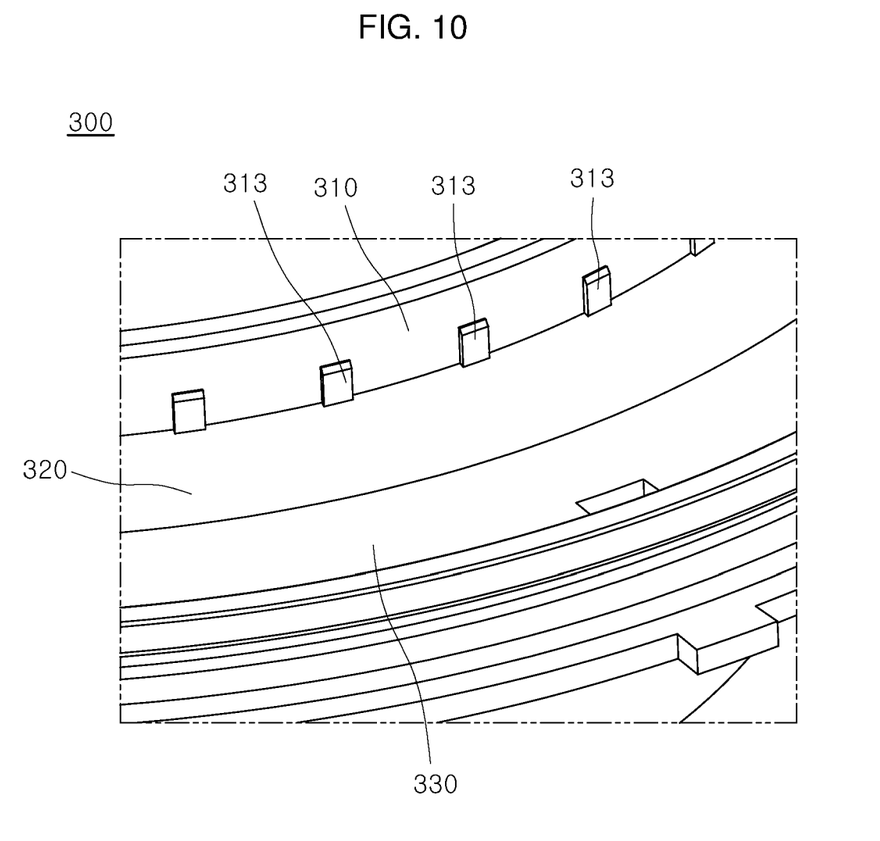
FIG. 10 is an expanded view of a portion of a second case in accordance with the embodiment of the present disclosure.
Figure 11:
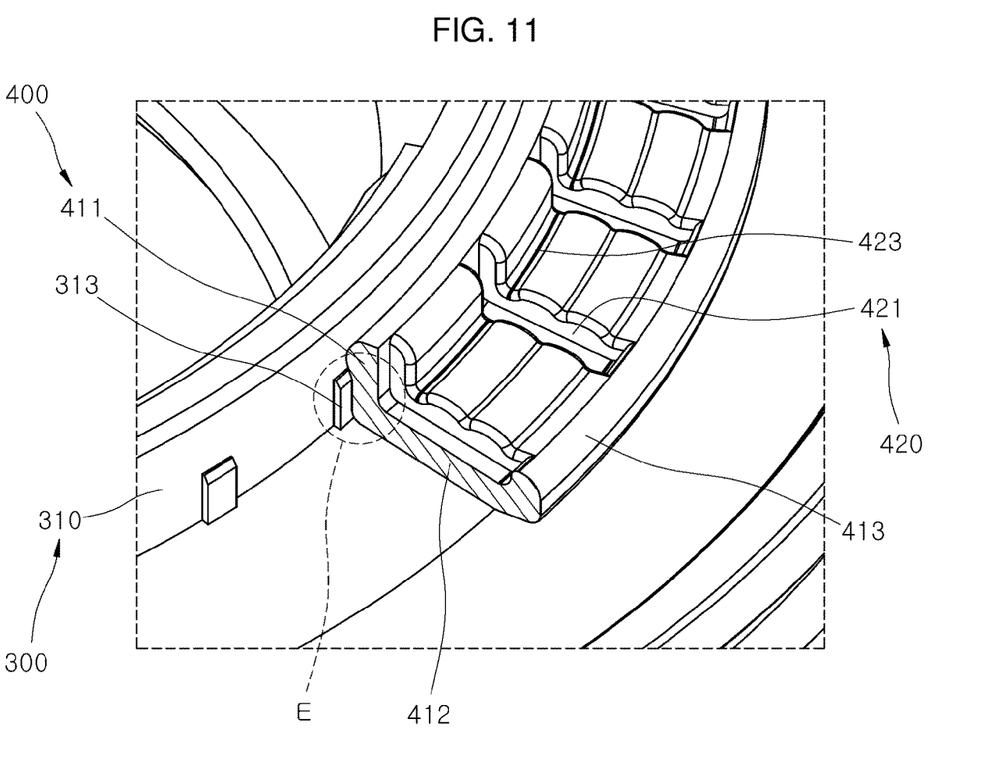
FIG. 11 is a perspective view illustrating that the second case and the center plate in accordance with the embodiment of the present disclosure are coupled.

FIG. 8 is an expanded view of a portion A of FIG. 3, FIG. 9 is a vertical cross-sectional view of a center plate in accordance with the embodiment of the present disclosure, FIG. 10 is an expanded view of a portion of a second case in accordance with the embodiment of the present disclosure, and FIG. 11 is a perspective view illustrating that the second case and the center plate in accordance with the embodiment of the present disclosure are coupled.

Referring to FIGS. 1 to 11, a strut bearing assembly 10 for a vehicle in accordance with an embodiment of the present disclosure includes a first case 200, a second case 300 and a center plate 400.

The first case 200 is coupled to an insulator 100 mounted on a vehicle body, and has a strut disposed therethrough.

A suspension system includes a strut having a shock absorber embedded therein and a coil spring installed on the outside thereof. The top of the strut is coupled to the vehicle body through a top mount assembly, and the bottom thereof is coupled to a knuckle. The strut is configured to rotate with respect to the vehicle body, as the wheel is steered. The top mount assembly may include the insulator 100 and the strut bearing assembly 10 for a vehicle.

The insulator 100 is connected to the shock absorber, and serves to relieve shock transferred from the road when the vehicle travels. The insulator 100 may include an upper plate, a lower plate and a rubber bushing (not illustrated) disposed between the upper plate and the lower plate. In the following descriptions, a top-to-bottom direction indicates the height direction of the vehicle, i.e. the longitudinal direction of the strut.

The first case 200 may be coupled to the bottom of the insulator 100. The first case 200 may be formed in a ring shape with a hollow portion, and the strut may be inserted into the hollow portion. The first case 200 may include a first hook 220. The first hook 220 may be formed in a hook shape in which an end portion thereof is bent, and the end portion may protrude from the inner circumferential surface of the first case 200 to the outside in a radial direction. The first hook 220 may be formed in a circular arc shape in the circumferential direction of the first case 200, and provided as a plurality of hooks which are spaced apart from each other in the circumferential direction. Reference numeral 230 represents the space into which vertical portions of the second case 300 and the center plate 400 are inserted.

The second case 300 is mounted under the first case 200 in the top-to-bottom direction of the vehicle and provided to rotate relatively to the first case 200, and has the strut disposed therethrough.

The second case 300 may be rotated relatively to the first case 200 when the vehicle is steered, and thus absorb a load caused by a rotation operation of the shock absorber. The second case 300 may be formed in a ring shape with a hollow portion, and disposed so that the top surface thereof faces the bottom surface of the first case 200. The strut may be inserted into the hollow portion of the second case 300.

The second case 300 may include a second hook 311. The second hook 311 may be formed at a position corresponding to the position of the first hook 220, and coupled to the first hook 220. In this way, the second case 300 and the first case 200 may be coupled to each other. The second hook 311 may be formed in a hook shape in which an end portion thereof is bent, and the end portion may protrude from the inner circumferential surface of the second case 300 to the inside in the radial direction. The second hook 311 may be formed in a circular arc shape in the circumferential direction of the second case 300, and provided as a plurality of hooks which are spaced apart from each other in the circumferential direction. However, the shapes of the first and second hooks 220 and 311 are not limited thereto, and the first and second hooks 220 and 311 may be continuously formed in the circumferential direction of the first and second cases 200 and 300.

The second case 300 may be formed of thermoplastic resin through injection molding. For example, the second case 300 may be formed of a polyamide material having excellent strength and durability.

The center plate 400 is interposed between the first and second cases 200 and 300, and supports the first case 200 to rotate relatively to the second case 300.

The center plate 400 may support the load of the vehicle body, which is transferred through the insulator 100 and the first case 200 and applied to the suspension system, while allowing free rotation between the first and second cases 200 and 300. At this time, a lubricant may be supplied between the center plate 400 and the first case 200, and the supplied lubricant may allow the free rotation between the first and second cases 200 and 300. The lubricant may be lubricating oil such as grease. That is, the strut bearing assembly 10 in accordance with the embodiment of the present disclosure may have a sliding bearing structure.

The center plate 400 may be formed of a synthetic resin material with excellent sliding performance. For example, the center plate 400 may be made of PBT (Polybutylene Terephthalate) which is a kind of engineering plastic. The PBT has a certain degree of rigidity, and has a self lubricating property and excellent wear resistance.

The center plate 400 may be made of a material having lower rigidity than the second case 300. Thus, the center plate 400 may be pressed and coupled to the second case 300.

Referring to FIGS. 1 to 7, the center plate 400 may be formed in a ring shape with a hollow portion, and include a plate body 410. The plate body 410 may include an inclined portion 412, a vertical portion 411 and an end portion 413.

The inclined portion 412 may be inclined downward toward the outside in the radial direction based on the center axis of the strut. The vertical portion 411 may be extended vertically from the inner end of the inclined portion 412 in the radial direction. The end portion 413 may be extended outward from the outer end of the inclined portion 412 in the radial direction.

The angle θ of the inclined portion 412 may be decided in consideration of loads applied to the first and second cases 200 and 300 and the center plate 400.

The angle θ of the inclined portion 412 may be set to such an angle that minimizes stress applied to the strut bearing assembly 10 according to the distribution of the loads applied to the first and second cases 200 and 300 and the center plate 400.

The strut bearing assembly in accordance with the embodiment of the present disclosure may be applied to a Macpherson-type suspension system. Due to the characteristic of the Macpherson-type suspension system, a load applied to the strut bearing assembly 10 may act in the lateral direction as well as the vertical direction. When the center plate 400 includes only the vertical portion 411 and a horizontal portion, the center plate effectively supports a load in the vertical direction, but may be vulnerable to a load in the horizontal direction. In this case, the first and second cases 200 and 300 and the center plate 400, which constitute a part, may be deformed.

The strut bearing assembly in accordance with the embodiment of the present disclosure may be provided to solve such a problem, and apply the optimal inclination angle to the center plate 400, thereby improving the load supporting force in the horizontal direction as well as the vertical direction. Therefore, the strength of the strut bearing assembly 10 in accordance with the embodiment of the present disclosure may be increased to improve friction performance and durability performance.

The angle θ of the inclined portion 412 may be set to the optimal angle in consideration of a load acting on the suspension system of the vehicle to which the strut bearing assembly is applied.

As such, when the inclined portion 412 is applied to the center plate 400, the stress may be reduced more than in the case that the center plate 400 has no inclined portion 412, and the optimal angle may be set through an experiment.

The angle of the inclined portion 412 may be changed according to the distribution of loads applied to the suspension system, or specifically the directions of the loads.

The second case 300 in accordance with the embodiment of the present disclosure may include a vertical part 310, an inclined part 320 and a horizontal part 330, which are formed to correspond to the plate body 410.

The vertical part 310 may be formed vertically in the longitudinal direction of the strut so as to be placed close to the vertical portion 411.

The inclined part 320 may be extended from the vertical part 310, and provided close to the inclined portion 412. The inclined part 320 may be formed to have an inclination angle corresponding to the inclined portion 412.

The horizontal part 330 may be extended horizontally from the inclined part 320, and provided close to the end portion 413. Therefore, as the second case 300 is provided close to the plate body 410, the second case 300 may stably support the center plate 400, and prevent the center plate 400 from moving with respect to the second case 300.

The first case 200 includes a case body 210. The case body 210 may be formed in a shape corresponding to the shapes of the center plate 400 and the second case 300, and spaced apart from the center plate 400 so as to form a lubricant space 213 to which a lubricant is supplied. That is, the case body 210 may be formed so that a portion 211 thereof, facing the center plate 400, is spaced apart from the center plate 400.

Referring to FIGS. 2, 8 and 9, the first and second cases 200 and 300 may be provided to rotate relatively to each other through a lubricant supplied between the center plate 400 and the first case 200. The center plate 400 may include a lubricant containing groove 420 to maintain such a lubricant.

The lubricant containing groove 420 of the center plate 400 may be open upward, so that a lubricant is contained in a surface thereof, facing the first case 200. Thus, the lubricant between the center plate 400 and the first case 200 is maintained.

As described above, the first and second cases 200 and 300 are provided to rotate relatively to each other through the lubricant supplied between the center plate 400 and the first case 200. However, when the second case 300 is rotated while the vehicle is steered, the lubricant between the center plate 400 and the first case 200 may leak to the outside.

Since the center plate 400 in accordance with the embodiment of the present disclosure includes the inclined portion 412 which is inclined downward toward the outside in the radial direction, the lubricant is highly likely to leak to the outside.

In accordance with the present embodiment, the center plate 400 includes the lubricant containing groove 420. Thus, even when the center plate 400 has an inclined structure, a lubricant for lubrication action may be maintained between the first case 200 and the center plate 400. Such a structure may reduce the friction resistance between the first case 200 and the center plate 400, remove a connection problem, and improve the durability.

The lubricant containing groove 420 includes a first containing groove 421 and a second containing groove 423.

The first containing groove 421 may be elongated in the radial direction based on the central axis of the strut. The first containing groove 421 may be formed as a plurality of containing grooves which are spaced apart from each other in the circumferential direction of the center plate 400.

That is, the plurality of first containing grooves 421 may be radially formed on the center plate 400, based on the central axis of the strut. At this time, the plurality of first containing grooves 421 may be spaced apart from each other at predetermined intervals.

The first containing groove 421 may include a bump portion 422. The bump portion 422 may be vertically provided at the end portion 413 in the radial direction such that the lubricant does not leak along the inclined portion 412.

The second containing groove 423 may be formed in the circumferential direction of the center plate 400.

Specifically, the second containing groove 423 may be disposed on a virtual circle on the center plate 400, based on the central axis of the strut. The second containing groove 423 may be formed at the top surface of the center plate 400 so as to be recessed downward.

Furthermore, the second containing groove 423 may be formed as a plurality of grooves which are spaced apart from each other in the circumferential direction of the center plate 400. Each of the second containing grooves 423 may be disposed between the first containing grooves 421 adjacent to each other, and formed to communicate with the first containing groove 421.

That is, the plurality of first containing grooves 421 may be spaced apart in the circumferential direction, and each of the second containing grooves 423 may be controlled by the first containing grooves 421 adjacent to each other.

For example, a plurality of concentric circles may be virtually formed around the strut, a first group of containing grooves serving as some of the plurality of second containing grooves 423 may be formed on any one virtual circle, and a second group of containing grooves serving as the others of the plurality of second containing grooves 423 may be formed on another virtual circle. Thus, the first group of containing grooves and the second group of containing grooves may be formed while forming concentric circles as a whole.

The second case 300 may include a protrusion part. The protrusion part may protrude from the coupling surface to which the center plate 400 is coupled, such that the center plate 400 is pressed and coupled to the second case 300.

Since the center plate 400 needs to be coupled to the second case 300, a structure for preventing rotation needs to be provided between the second case 300 and the center plate 400. In the related art, a concavo-convex structure is formed on the contact surface between the second case 300 and the first case 200.

In this case, the assembly positions of the first and second cases 200 and 300 needs to be aligned during an assembly process, which is disadvantageous in terms of the productivity. Furthermore, when the first and second cases are assembled even though the positions thereof are not aligned, the first and second cases may be damaged in case that a load is applied in the top-to-bottom direction during the assembly process. Therefore, the embodiment of the present disclosure includes the protrusion part formed on the second case 300, in order to solve the above-described problem.

The protrusion part may include a plurality of insertion protrusions 313 which are formed on the coupling surface so as to be elongated in the vertical direction, and the plurality of insertion protrusions 313 may be spaced apart from each other in the circumferential direction of the second case 300.

The second case 300 may include the vertical part 310 formed in a cylindrical shape, the inclined part 320 extended from the vertical part 310, and the horizontal part 330 extended horizontally from the inclined part 320.

The insertion protrusions 313 may be formed vertically on the outer surface of the vertical part 310.

The plurality of insertion protrusions 313 may be formed on the outer surface of the vertical part 310 so as to be spaced apart from each other in the circumferential direction, and elongated in the vertical direction. However, the shape of the insertion protrusion 313 is not limited thereto, but may be modified in various manners as long as the plurality of insertion protrusions 313 can be formed to be spaced apart from each other.

The center plate 400 may be made of a material having lower rigidity than the second case 300.

The second case 300 may be formed of a polyamide material having excellent strength and durability. Furthermore, the center plate 400 may be made of PBT which is a kind of engineering plastic.

The materials of the second case 300 and the center plate 400 are not limited to the above-described materials, but various materials may be applied thereto as long as the center plate 400 can be made of a material having lower rigidity than the second case 300.

As the center plate 400 is made of a material having lower rigidity than the second case 300, the center plate 400 may be pressed and inserted when the center plate 400 and the second case 300 are assembled. Thus, the center plate 400 may be coupled, as portions corresponding to the insertion protrusions 313 are deformed.

That is, when the vertical portion 411 of the center plate 400 is inserted into the vertical part 310 of the second case 300, the center plate 400 having relatively low rigidity may be deformed at the portions where the insertion protrusions 313 are formed. As the center plate 400 is deformed, the insertion protrusions 313 may recess the outer surface of the center plate 400.

Therefore, when the vehicle is steered, no rotation or slip may occur between the center plate 400 and the second case 300. Therefore, the strut bearing assembly in accordance with the embodiment of the present disclosure may prevent separation to improve connection. Furthermore, since the assembly positions do not need to be aligned during the assembly process, the workability may be improved.

In the present embodiment, the optimal inclination angle may be applied to the center plate, which makes it possible to improve the load supporting force in the horizontal direction as well as the vertical direction. The strength of the strut bearing assembly in accordance with the embodiment of the present disclosure may be increased to improve the friction performance and the durability performance.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A strut bearing assembly for a vehicle, comprising:
    a first case coupled to an insulator mounted on a body of the vehicle, and having a strut disposed therethrough;
    a second case mounted under the first case in a top-to-bottom direction of the vehicle, configured to rotate relatively to the first case, and having the strut disposed therethrough; and
    a center plate disposed between the first and second cases, and configured to support the first case to rotate relative to the second case, wherein the center plate has a ring shape with a hollow portion, and includes an inclined portion that is inclined downward toward an outside in a radial direction based on a central axis of the strut, and the center plate comprises a plate body, and the plate body includes the inclined portion, a vertical portion extended from an inner end of the inclined portion that vertically interfaces with at least a portion of the first case, and an end portion extended from an outer end of the inclined portion.

2. The strut bearing assembly of claim 1, wherein the second case comprises:

a vertical part disposed adjacent to the vertical portion;

an inclined part extended from the vertical part, and disposed adjacent to the inclined portion; and a horizontal part extended horizontally from the inclined part and disposed adjacent to the end portion, such that the second case is disposed adjacent to the plate body.

3. The strut bearing assembly of claim 2, wherein the vertical part includes an insertion protrusion disposed on an outer surface thereof, and the center plate is deformed by the insertion protrusion in an assembled state of the center plate and the second case.

4. The strut bearing assembly of claim 1, wherein the first case comprises a first hook disposed in a circumferential direction of the first case, wherein the second case comprises a second hook disposed in a circumferential direction of the second case, and wherein the first and second hooks are coupled to each other.

5. The strut bearing assembly of claim 1, wherein the second case is made of a polyamide material.

6. The strut bearing assembly of claim 1, wherein the center plate is made of polybutylene terephthalate (PBT).

7. The strut bearing assembly of claim 1, wherein the center plate is made of a material having rigidity lower than a rigidity of the second case.

8. The strut bearing assembly of claim 1, wherein the center plate further includes a plurality of grooves disposed on an upper surface of the inclined portion, and configured to contain a lubricant.

9. The strut bearing assembly of claim 8, wherein the plurality of grooves includes first grooves elongated in the radial direction and spaced apart at intervals in a circumferential direction based on the central axis of the strut.

10. The strut bearing assembly of claim 9, wherein the plurality of grooves includes second grooves elongated in the circumferential direction, spaced apart at intervals in the radial direction, and disposed between adjacent first grooves, among the first grooves.

11. The strut bearing assembly of claim 8, wherein the plurality of grooves includes grooves elongated in a circumferential direction based on the central axis of the strut, and spaced apart at intervals in the radial direction.

* * * * *